(12) United States Patent
Shirvanian

(10) Patent No.: US 8,623,779 B2
(45) Date of Patent: Jan. 7, 2014

(54) CATALYST LAYER SUPPORTED ON SUBSTRATE HAIRS OF METAL OXIDES

(75) Inventor: Alireza Pezhman Shirvanian, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 13/355,853

(22) Filed: Jan. 23, 2012

(65) Prior Publication Data

US 2012/0202682 A1     Aug. 9, 2012

Related U.S. Application Data

(60) Provisional application No. 61/439,545, filed on Feb. 4, 2011.

(51) Int. Cl.
   *B01J 23/00*     (2006.01)
   *B01J 23/70*     (2006.01)
   *B01J 23/72*     (2006.01)

(52) U.S. Cl.
   USPC ........... 502/300; 502/345; 977/762; 977/764; 977/840

(58) Field of Classification Search
   USPC ............... 502/300–355; 977/762, 764, 890
   See application file for complete search history.

(56) References Cited

U.S. PATENT DOCUMENTS

| | | |
|---|---|---|
| 4,364,813 A | 12/1982 | White |
| 4,490,219 A | 12/1984 | Bindra et al. |
| 4,513,066 A | 4/1985 | Simon |
| 5,856,036 A | 1/1999 | Smotkin et al. |
| 5,879,827 A | 3/1999 | Debe et al. |
| 5,879,828 A | 3/1999 | Debe et al. |
| 6,391,487 B1 | 5/2002 | Totsuka |
| 6,733,638 B2 | 5/2004 | Andrews et al. |
| 6,783,569 B2 | 8/2004 | Cheon et al. |
| 6,864,010 B1 | 3/2005 | McLean |
| 7,141,328 B2 | 11/2006 | Fukumoto et al. |
| 7,179,561 B2 * | 2/2007 | Niu et al. ............ 429/409 |
| 7,303,834 B2 | 12/2007 | Dearnaley et al. |
| 7,339,184 B2 * | 3/2008 | Romano et al. ............ 257/1 |
| 7,351,444 B2 | 4/2008 | Wang et al. |
| 7,498,097 B2 | 3/2009 | Veda et al. |

(Continued)

FOREIGN PATENT DOCUMENTS

| | | |
|---|---|---|
| EP | 1492621 B1 | 1/2007 |
| EP | 1857205 A1 | 11/2007 |

(Continued)

OTHER PUBLICATIONS

Shankar, K. et al., Fabrication of Nanowires of Multicomponent Oxides: Review of Recent Advances, Materials Science and Engineering C, 25, 2005, pp. 738-751.

(Continued)

*Primary Examiner* — Anthony J Zimmer
(74) *Attorney, Agent, or Firm* — Damian Porcari; Brooks Kushman P.C.

(57) ABSTRACT

In one embodiment, a catalyst assembly includes a substrate including a substrate base and a number of substrate hairs extending longitudinally from the substrate base, the substrate base including a metal M, the number of substrate hairs including an oxide of the metal M; and a catalyst film contacting at least a portion of the substrate.

17 Claims, 5 Drawing Sheets

(56) References Cited

U.S. PATENT DOCUMENTS

| | | | |
|---|---|---|---|
| 8,367,435 B2* | 2/2013 | Chow et al. | 438/22 |
| 2004/0167014 A1 | 8/2004 | Yan et al. | |
| 2005/0112048 A1 | 5/2005 | Tsakalakos et al. | |
| 2005/0142433 A1 | 6/2005 | Veda et al. | |
| 2005/0208354 A1 | 9/2005 | Hahn et al. | |
| 2006/0040168 A1* | 2/2006 | Sridhar | 429/40 |
| 2006/0172885 A1 | 8/2006 | Shimazu et al. | |
| 2006/0223696 A1 | 10/2006 | Miyoshi et al. | |
| 2006/0257717 A1 | 11/2006 | Huang | |
| 2007/0059452 A1 | 3/2007 | Debe et al. | |
| 2007/0059573 A1 | 3/2007 | Debe et al. | |
| 2007/0082256 A1 | 4/2007 | Debe et al. | |
| 2007/0212538 A1 | 9/2007 | Wiu | |
| 2007/0248875 A1 | 10/2007 | O'Brien et al. | |
| 2007/0254141 A1 | 11/2007 | Morse et al. | |
| 2008/0020261 A1 | 1/2008 | Hendricks et al. | |
| 2008/0020923 A1 | 1/2008 | Debe et al. | |
| 2009/0004552 A1* | 1/2009 | Sun et al. | 429/44 |
| 2010/0092841 A1 | 4/2010 | Lopez et al. | |

FOREIGN PATENT DOCUMENTS

| | | |
|---|---|---|
| WO | 9624958 A1 | 8/1996 |
| WO | 2007032991 A2 | 3/2007 |
| WO | 2007047088 A1 | 4/2007 |
| WO | 2009062096 A1 | 5/2009 |

OTHER PUBLICATIONS

Comini, Elisabetta, et al., Metal Oxide Nanowires: Preparation and Application in Gas Sensing, Journal of Molecular Catalysis A: Chemical, 305, 2009, pp. 170-177.

Sun, Shibin, et al, Synthesis of Bundled Tungsten Oxide Nanowires with Controllable Morphology, Materials Chracterization 60, 2009, pp. 437-440.

Lim, Jae Hoon, et al., Formation of Niobium Oxide Nanowires by Thermal Oxidation, Journal of Industrial and Engineering Chemistry 15, 2009, pp. 860-864.

Ferreira, P.J., et al., Instability of Pt/C Electrocatalysts in Proton Exchanges Membrane fuel Cells, J. Electrochem Soc., 152 (11), 2005, pp. A2256-A2271.

Stamenkovic, V., et al., Surface Composition Effects in Electrocatalysis: Kinetics of Oxygen Reduction on Well-Defined Pt3Ni and Pt3Co Alloy Surfaces, J. Phy. Chem B., 106, 2002, pp. 11970-11979.

Paulus U.A., et al., Oxygen Reduction on High Surface Area Pt-based Alloy Catalysts in Comparison to Well Defined Smooth Bulk Alloy Electrodes, Electrochimica Acta, 47, 2002, pp. 3787-3798.

Stamenkovic, V., et al., Surface Segregation Effect in Electrocatalysis: Kinetics of Oxygen Reduction Reaction on Polycrystalline Pt3Ni Alloy Surfaces, J. Electroanalytical Chem, 554-555, 2003, pp. 191-199.

Vayenas, Constantine, SpringerLink, Modern Aspects of Electrochemistry, Journal Article, vol. 26, No. 12, May 1, 1996, Abstract Only, pp. 1-2.

Sang, Hwui, et al., MRS Materials Research Society, Platinum Nanostructure Growth Using Self-Assembled Fuoorocarbon Structure, Spring 2007, Abstract Only,.

N. Travitsky et al., Science Direct, Abstract: Pt-, PtNi- and PtCo-supported Catalysts for oxygen reduction in PEM fuel cells, Journal of Power Sources, vol. 161, Issue 2, Oct. 27, 2006, pp. 782-789.

R. Hector et al., Science Direct, Durability study of Pt3Ni1 Catalysts as Cathode in PEM fuel cells, Electrochemistry Communications, vol. 6, Issue 8, Aug. 2004, pp. 795-799, Abstract Only.

Yuguang Ma et al., Science Direct, Abstract: Pt surface segregation in bimetallic Pt3M alloys: A density funcitonal theory study, Surface Science, vol. 602, Issue 1, Jan. 1, 2008, Abstract Only.

Hai-Yan Su et al., Modulating the reactivity of Ni-containing Pt(111)-skin catalysts by density functional theory calculations, The Journal of Chemical Physics, Abstract Only, May 19, 2008.

Yarris, Lynn, Research News Berkeley Lab, A Boost for Hydrogen Fuel Cell Research, Jan. 25, 2007, pp. 1-4.

Fuel Cells Durability—Stationary 1/2 Automotive 1/2 Portable, Omni Shoreham Hotel, Washington, D.C., View Conference Brochure, View Exhibit Information (PDF) Jul. 10, 2008, pp. 1-8.

Pezchman, Platinum in Fuel Cells Gets a Helping Hand, News of the Week, vol. 315, Jan. 12, 2007, www.sciencemag.org, pp. No. 172.

Zhang, Platinum Monolayer on Nonnoble Metal-Noble Metal Core-Shell Nanoparticle Electrocatalysis for O Reduction, The Journal of Physical Chemistry B, Mar. 3, 2009, pp. 1-5.

Debe, M., et al., High Voltage Stability of Nano-structured Thin Film Catalysts for PEM Fuel Cells, J. Power Sources, 161, 2006, pp. 1002-1011.

Gancs, L. et al., Crystallographic Characteristics of Nano-structured Thin Film fuel Cell Electrocatalysts, a HRTEM Study, Chem. Master 20, 2008, pp. 2444-2454.

* cited by examiner

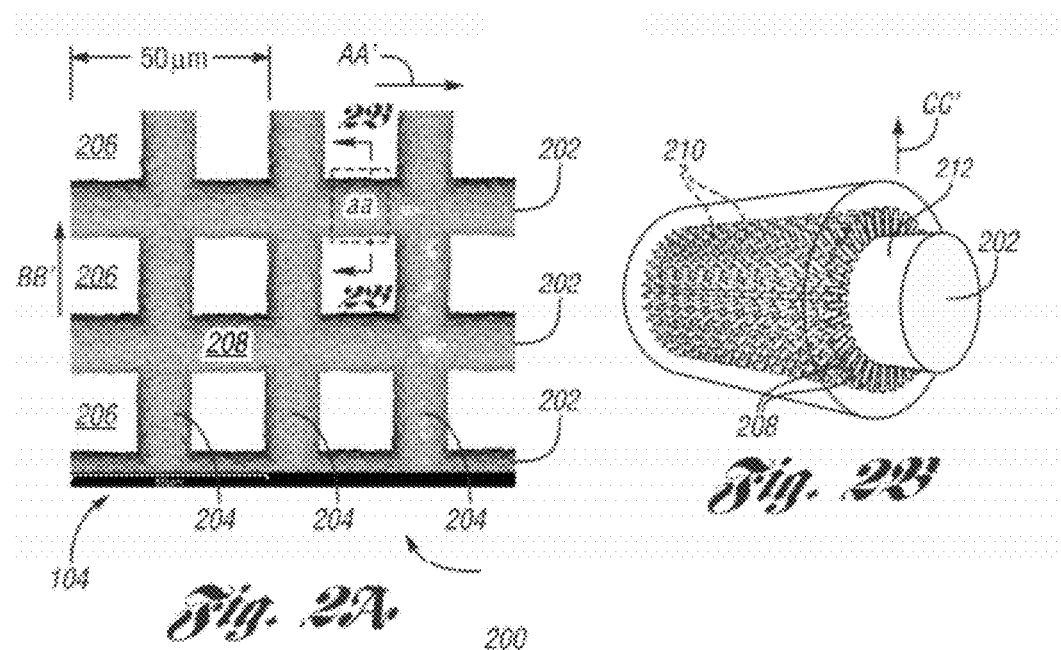
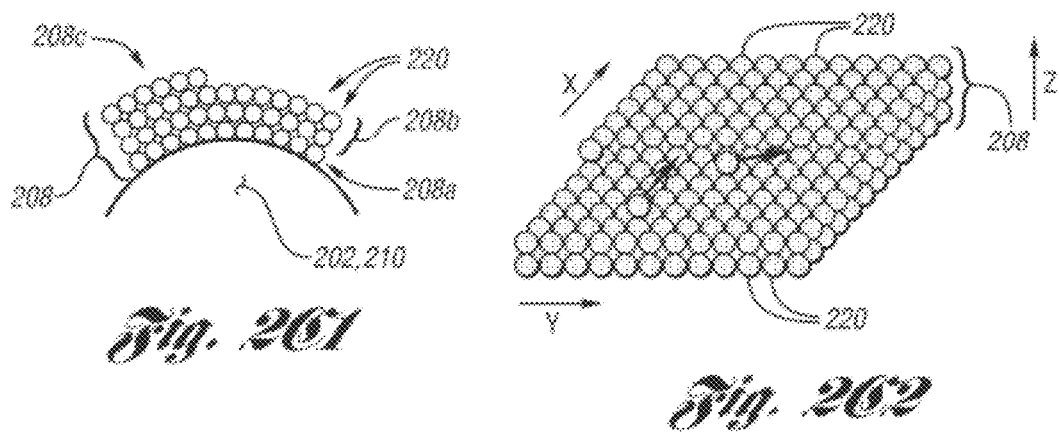
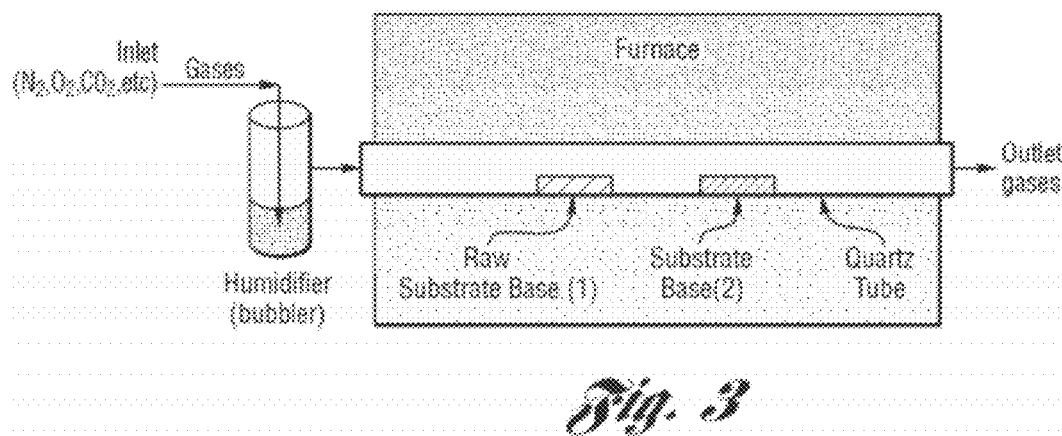

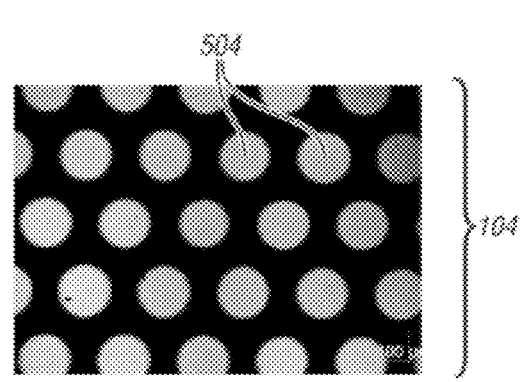
Fig. 5A.
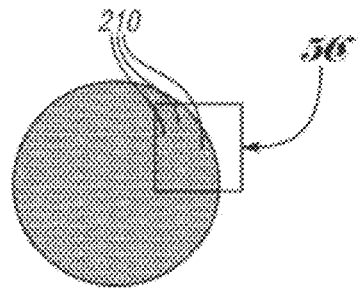
Fig. 5B.
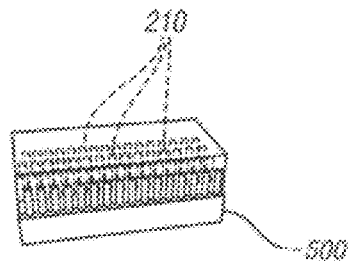
Fig. 5C.
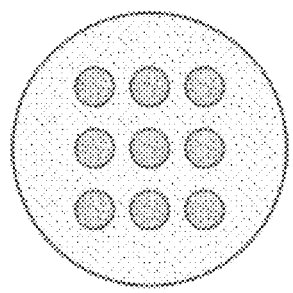
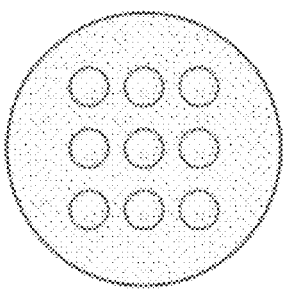
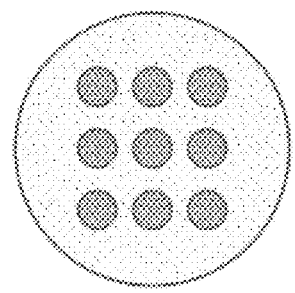
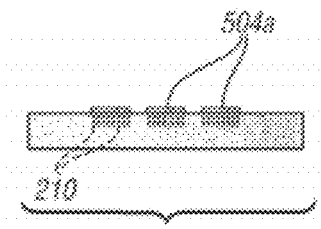
Fig. 6A.
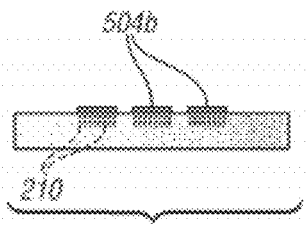
Fig. 6B.
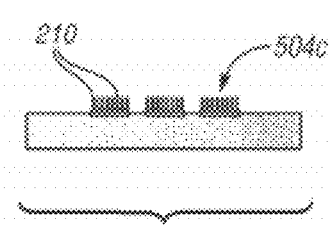
Fig. 6C.

CATALYST LAYER SUPPORTED ON SUBSTRATE HAIRS OF METAL OXIDES

CROSS REFERENCE TO RELATED APPLICATION

This application claims the benefit of U.S. provisional application Ser. No. 61/439,545 filed Feb. 4, 2011, entire contents thereof are incorporated herein by reference.

TECHNICAL FIELD

The present invention relates to a catalyst layer supported on substrate hairs of metal oxides.

BACKGROUND

Reliability and working lifetime are important considerations in commercializing fuel cell (FC) technologies for automotive applications. As important as catalyst durability is the catalyst activity in leading to successful commercialization of fuel cell vehicles. Development of a highly active and durable catalyst for PEMFC applications remains a key challenge.

SUMMARY

In one embodiment, a catalyst assembly includes a substrate including a substrate base and a number of substrate hairs extending longitudinally from the substrate base, the substrate base including a metal M, the number of substrate hairs including an oxide of the metal M; and a catalyst film contacting at least a portion of the substrate. At least a portion of the number of substrate hairs may be spaced apart from each other with an average distance of 10 to 500 nanometers. At least a portion of the number of substrate hairs may have an average thickness dimension of 10 to 200 nanometers. At least a portion of the number of substrate hairs may have an average length dimension of 0.05 to 20 micrometers. The number of substrate hairs may include 90 weight percent of the metal oxide based on total weight of the number of substrate hairs. The substrate base may include a plurality of first and second spaced apart strands extending longitudinally in first and second directions, respectively, to form a mesh with openings each bounded by an adjacent pair of the first spaced apart strands and an adjacent pair of the second spaced apart strands, the number of substrate hairs extending from at least one of the first and second spaced apart strands. Alternatively, the substrate base may include a number of discontinuous, spaced apart substrate base areas, the number of substrate hairs contacting at least one of the spaced apart substrate base areas. At least a portion of the catalyst film may include a first atomic layer, a second exposed atomic layer, and a number of intermediate atomic layers between the first and second atomic layers, wherein the total number of the atomic layers is 2 to 20 atomic layers. The catalyst film may contact both the substrate base and the number of substrate hairs.

In another embodiment, a method of forming a catalyst assembly includes depositing a catalyst film onto a substrate, a substrate including a substrate base and a number of substrate hairs extending radially and/or longitudinally from the substrate base, the substrate base including a metal M, the number of substrate hairs including an oxide of the metal M. The method may further include forming the number of substrate hairs by subjecting a raw substrate base including the metal M to oxidization such that the metal M contained within a portion of the raw substrate base is oxidized to form the oxide of the metal M, with the remaining unoxidized portion of the raw substrate base becoming the substrate base. The oxidation may be carried with an elevated temperature. The oxidation may be carried out with an elevated humidity. The oxidation may be carried out with a gas flow. The oxidation may be carried out with a gas flow including at least one of oxygen, nitrogen and carbon dioxide. The gas flow may be humidified prior to contacting the raw substrate base for oxidation.

BRIEF DESCRIPTION OF THE DRAWINGS

FIG. 2A depicts an enlarged perspective view of the catalyst layer of FIG. 1;

FIG. 2B depicts an enlarged sectional view of the catalyst layer of FIG. 2A with substrate hairs;

FIG. 2C1 depicts an enlarged sectional view of the catalyst layer of FIG. 2B;

FIG. 2C2 depicts another enlarged section view of the catalyst layer of FIG. 2B;

FIG. 3 depicts a non-limiting example of the thermal oxidation process for forming substrate hairs of FIG. 2B;

FIGS. 4A to 4F depict, in various degrees of magnification, substrate hairs formed in relation to FIG. 3;

FIG. 5A depicts a catalyst layer including a number of spaced apart catalyst regions according to one or more other embodiments;

FIG. 5B depicts an enlarged view of one catalyst region of FIG. 5A;

FIG. 5C depicts an enlarged view of the catalyst region of FIG. 5B;

FIGS. 6A to 6C depict another view of the spaced apart catalyst regions of FIG. 5A.

DETAILED DESCRIPTION

Figure 1:
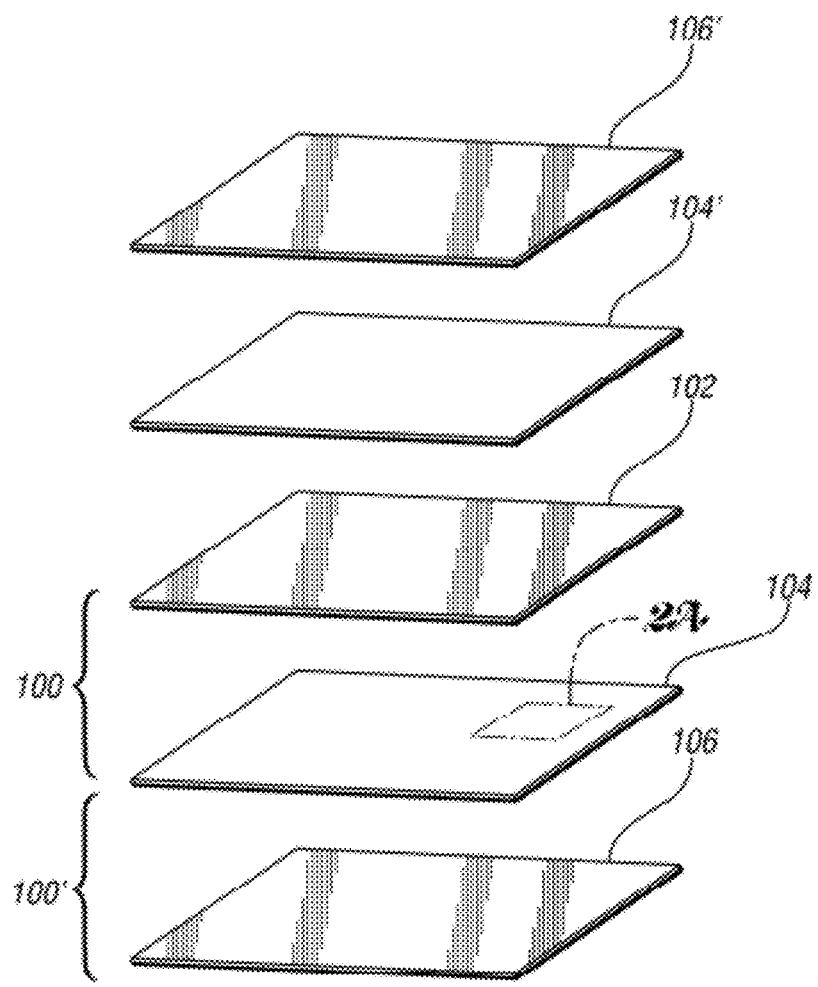
FIG. 1 depicts an electrode assembly including a catalyst layer according to one or more embodiments.
Figure 4A:
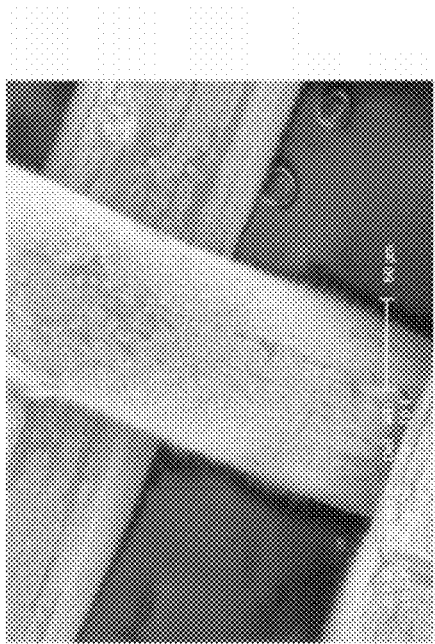
Figure 4B:
Figure 4C:
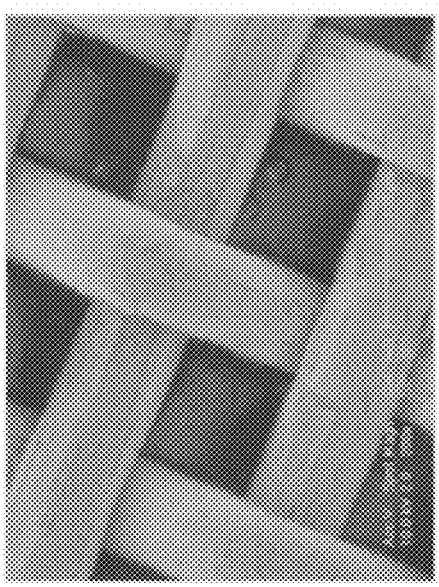
Figure 4D:
Figure 4A:
Figure 4B:
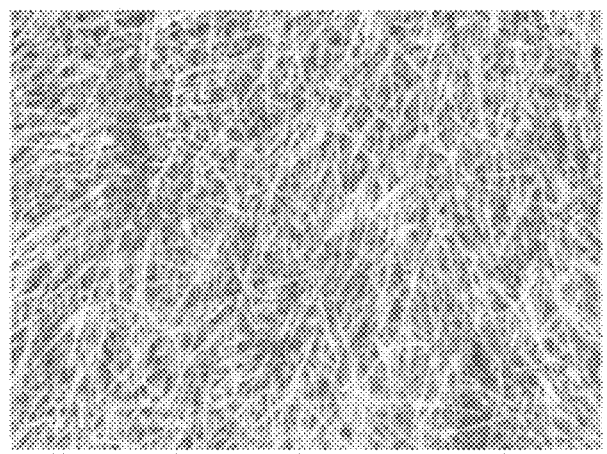

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in the description and in the claims are to be understood as modified by the word "about" in describing the broader scope of this invention. Also, unless expressly stated to the contrary, the description of a group or class of material as suitable or preferred for a given purpose in connection with the invention implies that mixtures of any two or more members of the group or class may be equally suitable or preferred.

Fuel cells have been pursued as a source of power for transportation because of their high energy efficiency and potential for fuel flexibility. However, broad commercialization of the fuel cells has been limited due to the high cost of the fuel cell catalyst.

One source of the high cost of fuel cell catalyst is due to the insufficient use of the catalyst itself. By way of example, conventional fuel cells employ catalyst nano-particles supported on porous carbon support. These catalyst nano-particles may include several hundred or more atoms of catalyst metals. In these catalyst nano-particles, only a few surface atomic layers of the nano-particles are accessible to fuel cell reactants and remain active for electrochemical reaction, while majority of the catalyst atoms toward the center of the nano-particle remain inaccessible and hence essentially inactive.

Further, insufficient use of the conventional catalyst may also be due to catalyst degradation inherent in these catalyst nano-particles. The catalyst degradation may proceed through one or more of these mechanisms: catalyst dissolution and re-deposition via the Oswald ripening process; coalescence and agglomeration of catalyst nano-particles via catalyst nano-crystallite migration on carbon support; catalyst detachment and de-activation triggered by corrosion of carbon support such as detachment of catalyst particles from the carbon support; and/or catalyst agglomeration due to high-end operation of fuel cells particularly under high temperatures. Because catalyst nano-particles, depending on their sizes, may have a melting point about a fraction of that for the corresponding catalyst bulk, and therefore catalyst nano-particles are relatively more prone to agglomeration and dissolution. These mechanisms may result in loss of electrochemically active area and degradation of the performance of the electrochemical cells. Without wanting to be limited to any particular theory, it is believed that the degradation mechanisms may have roots in high surface energy associated with the relatively small sizes of the nano-particles, as nano-particles tend to aggregate among themselves and form larger particles to attain a lower (and more stable) level of energy.

Another limitation associated with certain conventional fuel cell systems is ineffective flooding control. By way of example, certain reactants including oxygen/hydrogen gas, water, and protons cannot easily move across the catalyst sheet and as a result, little or no electrochemical reaction happens. Moreover, even if some oxygen gas, hydrogen gas, and proton do move across the catalyst sheet, resultant water molecules cannot easily move across the catalyst sheet and therefore water flooding often happens.

One or more embodiments of the present invention, as will be described in more detail below, alleviate some of the above-identified issues associated with the conventional fuel cell catalysts.

According to one aspect of the present invention, an electrode assembly is provided. In one embodiment, and as depicted in FIG. 1, the electrode assembly can be configured for use as a catalyst coated membrane 100 including a proton exchange membrane 102 and a catalyst layer 104. Alternatively, the electrode assembly can be used as a gas diffusion electrode 100' including a gas diffusion layer 106 and the catalyst layer 104. It is noted that the electrode assembly 100, 100' is equally applicable to the other side of the proton exchange membrane 102, for instance to include a catalyst layer 104' and a gas diffusion layer 106' for use as the other electrode.

FIG. 2A depicts an enlarged view of a portion of the catalyst layer 104, including first spaced apart strands 202 extending longitudinally in a first direction AA' and second spaced apart strands 204 extending longitudinally in a second direction BB', forming a mesh 200 defining a number of openings 206. FIG. 2B depicts an enlarged view of a section "aa" of the mesh 200 of FIG. 2A, showing a number of substrate hairs 210 projecting from the mesh 200. At least a portion of the number of substrate hairs 210 may be in a third direction CC' different from the direction AA' or BB'. In certain instances, the substrate hairs 210 extend radially from a surface 212 as shown in FIG. 2B. The substrate hairs 210 can be grown on any suitable surface of the mesh 200 to provide additional catalytic surface area. In certain instances, two or more planar layers of the mesh substrate 200 can be aligned next to each other to provide additional catalytic surface area.

In yet another embodiment, the openings 206 have an average planar linear dimension of 10 to 70 micrometers, wherein the planar linear dimension is the largest linear distance between any two points on the perimeter of each of the openings 206. Without being limited to any particular theory, it is believed that the openings thus sized further improves water management by limiting water accumulation in and around the openings 206 and thereby reducing the propagation of the water flooding into neighboring openings 206. Furthermore, any accumulated water can be wicked out through GDL to further enhance water management.

The openings 206 may be provided for passing certain fuel cell reactants including gases and liquids ordinarily involved in a fuel cell electrochemical reaction. Fuel cell reactants include many species depending upon the fuel cell type. Non-limiting examples of the hydrogen fuel cell reactants include oxygen gas, hydrogen gas, oxygen ions, hydrogen ions, and water molecules. The openings 206 may take any suitable geometric shapes. Non-limiting examples of the shapes include cones and pyramids.

In yet another embodiment, the openings 206 may be filled with ionomers to provide additional protonic or ionic connectivity, to assist proton transfer or can be left empty for gases to diffuse down to reach the membrane. When the openings are filled with ionomers, ionic charge carriers or protons can be carried out to the gas diffusion layer side of the catalyst layer (the mesh layer) where the electrochemical reaction takes place. If the openings are not filled with ionomers, the reactant gases must instead travel down towards the membrane adjacent to the catalyst layer to meet with ionic charge carriers or protons for reaction. In yet another embodiment, the openings 206 may be filled with a mixture of ionomer and porous carbon to provide additional ionic, electronic conductivity and to assist with water management and reactant transport.

Whether the openings 206 should be filled with ionomers is a matter of design. If the openings 206 are filled with ionomer, the ionic charge carriers and/or protons may be carried out to the catalyst layer adjacent to GDL layer where the electrochemical reaction can happen. This design may be appropriate if the mesh substrate 200 is relatively thick wherein the presence of ionomers can offset the relatively longer passage the ionic charge carriers and/or protons are to travel from one side of the mesh substrate 200 to the other. This design may also be more appropriate for low temperature fuel cells where the product water can form droplets that can be removed through GDL. If the openings are not filled with ionomer, the reactive gases must diffuse down the hole to reach the ionic charge carrier- and/or proton-rich membrane in order for the reaction to happen.

In yet another embodiment, the mesh 200 is provided with a porosity of from 25 to 75 percent, or more particularly from 35 to 65 percent. The term "porosity" may refer to a percentage of the openings 206 relative to the planar area of the catalyst layer 104. The porosity may be a function of size, shape and numbers of openings and grids, and thickness of the mesh substrate 200. As a combination parameter, the porosity may be adjusted to accommodate a particular catalyst loading requirement suitable for certain applications. In addition, when the mesh substrate 200 is relatively thick, an effective catalytic active area of the catalyst layer may be further increased by growing or depositing catalyst on the inside walls (e.g., perpendicular to the plane of the mesh substrate 200) of the openings without having to necessarily increase or decrease the porosity of the mesh substrate 200.

Referring back to FIG. 2A, the catalyst layer 104 further includes a catalyst film 208 in overlaying contact with at least one of the mesh 200 and the number of substrate hairs 210. In certain particular instances, the catalyst film 208 contacts at least a portion of the first and second spaced apart strands 202, 204 and at least a portion of the number of substrate hairs 210.

The catalyst 208 may be in direct contact with the mesh 200, the substrate hairs 210, or likely both. In either scenario, the catalyst 208 may be extensive in two-dimensions (2-D). As depicted in FIGS. 2C1 and 2C2, the catalyst 208 may include a first atomic layer of the catalyst atoms 220 generally shown at 208a, a second exposed atomic layer of the catalyst atoms 220 generally shown at 208c, and a number of intermediate atomic layers of the catalyst atoms 220 generally shown at 208b between the first and second atomic layers 208a and 208c, the total number of the atomic layers 208a to 208c being 2 to 50 atomic layers, 2 to 25 atomic layers, 2 to 20 atomic layers. At least a portion of the atomic layers 208a to 208c are each in at least one of a (111) crystalline arrangement, a (110) arrangement and a (001) crystalline arrangement. Within each of the atomic layers 208a to 208c, the catalyst atoms 220 are positioned next to each other in an organized crystalline structure. In this connection, a dimension along which the catalyst atoms 220 extend laterally, for instance in the directions of X and Y, is greater than a thickness dimension Z. The lateral dimension such as dimensions X and Y may be of at least 10 nanometers, 20 nanometers, 30 nanometers, 40 nanometers, 50 nanometers. By way of example, Pt atoms when closely packed are of about 0.27 nm in atom-to-atom distance. Therefore, 10 atomic layers of Pt atoms are of about 2.7 nm.

Referring back to FIGS. 2C1 and 2C2, the 2-D extensive catalyst 208 is presented in a pseudo-bulk configuration such that the catalytic metals behave, relative to conventional nano-particles, more like bulk metals. In this pseudo-bulk configuration, the catalyst 208 is presented as being x-axis and y-axis extensive relative to the z-axis. In certain instances, the thickness dimension along the z-axis may be in a range of 1 to 20 atomic layers, 2 to 16 atomic layers, or 4 to 10 atomic layers.

The substrate hairs 210 may have any suitable cross-sectional shapes, including the shapes of a round and a polygon such as triangles or rectangles. The substrate hairs 210 may have any suitable aspect ratios between an average length dimension and an average cross-sectional dimension. The aspect ratios of average length to cross-sectional dimensions may be no less than 1, 10, 50, 100, 150, or 200, and no greater than 10,000, 5,000, 1,000, or 500. The substrate hairs may be spaced apart from each other with an average distance in between an adjacent pair of the substrate hairs. The average distance may be no less than 1, 5, 10, 25, 50, 75, 100, or 150 nanometers, and no greater than 10,000, 5,000, 1,000, 500 or 250 nanometers.

The substrate hairs 210 may be formed via thermal oxidation. A suitable method of thermal oxidation may be found in "Formation of niobium oxide nanowires by thermal oxidation" by Lim et al., Journal of Industrial and Engineering Chemistry 15 (2009) 860-864. This illustrative method can be readily used to grow substrate hairs 210. To the extent of providing technical support in forming the substrate hairs by thermal oxidation, relevant contents of the Lim et al. are incorporated herein by reference. FIG. 3 in relation to Example 1 depicts a non-limiting example of the thermal oxidation process by which the substrate hairs may be generated. FIGS. 4A to 4F depict, in various degrees of magnification, the shape and dimension of the substrate hairs generated from the thermal oxidation process.

In this connection, a corrosion-resistive and economically efficient metal or metal alloy material can be selected to form the substrate 200. The substrate 200 can be thermal-oxidized in its entirety or partially to have hairs of metal oxides directly formed on the substrate 200. The type and nature of the metal oxides can be varied according to the metal or metal alloy material selected for the substrate 200. In addition, the pattern of growth and the length and width of the hairs 210, and the spacing between the hairs 210 may further be adjustable based on the oxidation parameters chosen for the thermal oxidation. Moreover, the growth of the hairs 210 directly originates from the substrate 200, and the hairs 210 can almost be considered as integral to the substrate 200 and are relatively more durable to sustain gas flows and chemical reactions occurring in the environment they are to be used in. Therefore, the present invention, in one or more embodiments, provides an energy and cost efficient method in providing a catalyst-supporting substrate suitable for use in certain chemical and electrochemical reaction environment and applications where corrosion is a problem and where reduction in catalyst consumption is a goal.

The substrate hairs 210 may be spaced apart from each other with an average distance of 10 to 500 nanometers, 50 to 500 nanometers, 100 to 400 nanometers, 100 to 300 nanometers, 200 to 500 nanometers, 300 to 500 nanometers, or 400 to 500 nanometers.

The substrate hairs 210 may have an average thickness dimension of 10 to 500 nanometers, 10 to 200 nanometers, 10 to 150 nanometers, 10 to 100 nanometers, 10 to 75 nanometers, 10 to 50 nanometers, 25 to 200 nanometers, 50 to 200 nanometers, 75 to 200 nanometers, 100 to 200 nanometers, 125 to 200 nanometers, or 150 to 200 nanometers.

The substrate hairs 210 may have an average length dimension of 0.05 to 20 micrometers, 0.5 to 20 micrometers, 0.5 to 15 micrometers, 0.5 to 10 micrometers, 0.5 to 5 micrometers, 1 to 20 micrometers, 2.5 to 20 micrometers, 5 to 20 micrometers, 7.5 to 20 micrometers, 10 to 20 micrometers, 12.5 to 20 micrometers, or 15 to 20 micrometers.

In yet another embodiment, and as depicted in FIGS. 5A-5C, the catalyst layer 104 may be configured as a number of spaced apart patches 504. As depicted in FIGS. 5A-5C, any one of the spaced apart patches 504 may include a substrate region 500 having a number of substrate hairs 210 extending substantially longitudinally from the substrate region 500. Catalyst atoms 220 shown in FIG. 2C1 may be deposited onto the substrate region 500 and/or the number of hairs 210 to form the catalyst film 208.

In yet another embodiment, and as shown in FIGS. 6A-6C, the first catalyst layer 504a can also be similarly configured, like the second catalyst layer 504c, to include a plurality of substrate hairs 210 extending longitudinally in a thickness direction or in a direction substantially transverse to the planar surface of the catalyst regions 504. In this configuration, the substrate hairs 210 as present on the first catalyst layer 504a and substrate hairs 210 as present on the second catalyst layer 504c may be directed away from each other.

The spaced apart patches 504 may be in any suitable shapes and sizes. In certain instances, the spaced apart patches 504 each have a surface contacting an electrochemical membrane such a proton exchange membrane (PEM) or a gas diffusion layer (GDL), the surface having a surface dimension. In this connection, the surface dimension is the maximum linear distance between any two points located on the outermost boundary line of the surface. The spaced apart patches 504 each have a thickness dimension smaller than the surface dimension. An aspect ratio of the surface dimension relative to the thickness dimension is greater than 1, and in certain instances, of the values of no less than 5, no less than 15, no less than 25, no less than 50, no less than 75, or no less than 100, and no greater than 5,000, no greater than 2,500, no greater than 1,500, no greater than 1,000, no greater than 750, no greater than 500, or no greater than 250.

Figure 7:
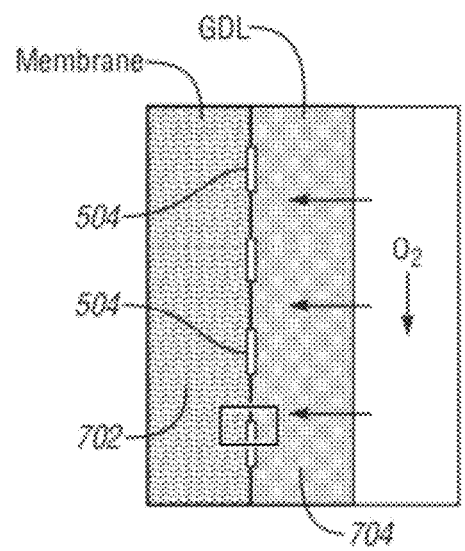
FIG. 7 depicts a cross-sectional view of an electrochemical cell employing the catalyst regions according to FIG. 5A and FIGS. 6A to 6C.

In yet another embodiment, and as depicted in FIG. 7, the catalyst regions 504 of FIGS. 6A-6C can be disposed between a proton exchange membrane (PEM) 702 and a gas diffusion layer (GDL) 704, wherein the first and second catalyst shell layers of the catalyst regions 504 are in contact with the PEM 702 and the GDL 704 respectively.

In one or more embodiments, the present invention is advantageous in that thermal oxidation is a versatile and simple method for generating substrate hairs in the enhancement of substrate surface areas. Thus, thermal oxidation process may provide a facile route to develop nano-structures on any suitable substrates. In addition, nano-structures dimensions, growth density, and other properties may be adjusted through oxidation parameters such that particular surface area values may be obtained. Non-limiting oxidation process parameters may include: temperature profile/history, substrate material and surface finishing, type and rate of gas flow over the substrate, and extent of humidification. For instance, substrate hairs of different dimensions may be obtained through the adjustment of oxidation duration.

In one or more embodiments, the present invention is advantageous in that thermal oxidation may be used to generate nano-structures of metal oxides that are resistive to the corrosive environment typical of most electrochemical devices including fuel cells. In this connection, certain metals and their corresponding oxides are relatively more particularly suitable for providing additional catalytic areas in the fuel cells. Non-limiting examples of these metals include Silicon (Si), Iron (Fe), Tungsten (W), Niobium (Nb); and non-limiting samples of their corresponding oxides include $SiO_2$, $Fe_2O_3$, $WO_x$, NbO, $NbO_2$, and $Nb_2O_5$ The availability of a wide range of metals and semi-conductor materials amenable to the thermal oxidation for growing nano-structures, the present invention is believed to be effective in widening design windows for catalytic surface area enhancement. For instance, niobium may be thermal oxidized to form niobium oxide substrate hairs. Niobium oxide is believed to be very stable in electrochemical environments and is largely corrosion resistive.

In one or more embodiments, the present invention is advantageous in that thermal oxidation may help effect desirable catalyst and substrate interactions. Using the thermal oxidation method described herein, one can employ the oxide and catalyst support interaction to generate high surface area substrates; to generate more active catalysts through, for instance, electronic structure and lattice mismatch interactions between support and catalyst, or through promotion of the growth of favorable crystalline facets of the catalyst due to interaction between catalyst and support. By using higher surface energy support metal oxide materials, one can generate a more conformal coating of catalyst on the support as opposed to nucleating the catalyst on the support. As a result, conformal coating of the catalyst on support leads to a true thin film with minimal and uniform thickness thereby reducing the requisite catalyst loading.

In one or more embodiments, the present invention is advantageous in that the nano-structures so formed can further be subject to one or more treatment coatings to enhance catalyst/substrate interactions and/or to promote catalyst growth. For instance, the nano-structures can be coated with a polymer or other suitable materials such as niobium oxide to provide enhanced resistance to corrosion. One or more of the treatment coatings may include polymers, metals, metal oxides, and/or semi-conductors to enhance durability/corrosion resistivity or promote formation of desirable facets on the catalyst. The treatment coating can be thick enough, for instance, 10 or more atomic layers, to reduce any potential electronic and structure effects of the oxide under-layer. Likewise, the treatment coating can be thin enough, for instance, less than 10 atomic layers, to facilitate interactions with the underlying oxide.

The substrate hairs 210 may be applicable to the thin film mesh catalyst (TFMC) described in the U.S. patent application Ser. No. 12/770,084, entitled "catalyst layer having thin film nanowire catalyst and electrode assembly employing the same," filed Apr. 29, 2010, the entire contents thereof being incorporated herein by reference.

The substrate hairs 210 may be applicable to the thin film array catalyst (TFAC) described in the U.S. patent application Ser. No. 12/770,277, entitled "fuel cell electrode assembly and method of making the same," filed Apr. 29, 2010, the entire contents thereof being incorporated herein by reference.

EXAMPLES

The thermal oxidation methods described herein will be detailed in relation to substrate hairs of copper oxide. However, it is appreciated that the methods are applicable to the production of other species of nano-substrate hairs and may be based on any other suitable metal and oxide materials.

Example 1

For illustration purposes, only one substrate of copper is used and the air is used as the inlet gas. Effects of the inlet gas humidity and temperature on the configuration of the Cu on substrate hairs are examined. Examined also are two types of mesh substrates onto which the nano-wires are grown. Mesh #1, or a relatively coarse mesh, is a copper woven wire cloth mesh supplied by McMaster Carr, having the size of 100×100 with a square size of 0.006", a wire diameter of 0.0045", and an open area percentage of 30%. Mesh #2, a relatively fine mesh, is a copper mesh supplied by e-forming having the size of 750×750, with a wire diameter of 0.00034".

For this test, temperature is set at 400° C., oxidation time is 4 hours, mesh #1 is used. The mesh is acid washed and cleaned with distilled water prior to the test. Lab air is used, which is not dry, and no external humidification is provided.

High oxygen pressure and/or the presence of water vapor in air may induce the formation of an oxidative environment, which may be attributable to the formation of Cu oxide substrate hairs. Vapor-liquid-solid (VLS) and/or vapor-solid (VS) may be used to facilitate the growth of substrate hairs in the gas phase.

As depicted in FIGS. 4A-4F, the grown substrate hairs appear to be about 50-100 nm in diameter with center to center (c/c) distances of 200-300 nm and up to 5 micron in length. A hexagonally grown array of substrate hairs being 100 nm in diameter, 200 nm in c/c distances, and 5 micron in length would generate a surface area of 40.25 $cm^2/cm^2$ of the planar area. Assuming a linear growth of Cu on substrate hairs over time, the oxidation time may be shortened to be about 1.2 hours to grow substrate hairs of 1.5 micron in length corresponding to 12.8 $cm^2/cm^2$ in planar area. To obtain a higher surface area, the substrate hairs may be grown to a length of 6.5 micron corresponding to 52 $cm^2/cm^2$ planar area and oxidation time may be extended to be around 5.2 hours. Given that the substrate hairs grown in the test are not necessarily grown in a hexagonal fashion, this surface area analysis can provide only an approximate. In general, this approximation analysis shows that with the diameter and density of the substrate hairs grown, the requisite surface area enhancements are achievable.

In a second test, the temperature is raised up to 550° C., and oxidation time is reduced to be about 2 hours. Mesh #2 is used. The mesh is acid washed and cleaned with distilled water prior to the testing. External humidification is applied.

Base on the tests, it appears that increasing temperatures, reduced requisite oxidation duration, and/or the use of external humidification help facilitate the growth of finer CuO substrate hairs. Without wanting to be limited to any particular theory, it is believed that the CuO substrate hairs may have grown based on the Vapor Solid (VS) mechanism, wherein water molecules help affect the adsorption and break-up of oxygen molecules on the metal surface during oxidation. The formation of water molecules may also be affected by the presence of nitrogen and other gases in the oxidative environment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A catalyst assembly comprising:
   a substrate including a substrate base and a number of substrate hairs extending longitudinally from the substrate base, the substrate base including a metal M, the number of substrate hairs including an oxide of the metal M and spaced apart from each other with an average distance of 10 to 500 nanometers; and
   a catalyst film contacting at least a portion of the substrate.

2. The catalyst assembly of claim 1, wherein the substrate hairs have an average thickness dimension of 10 to 200 nanometers.

3. The catalyst assembly of claim 1, wherein the substrate hairs have an average length dimension of 0.05 to 20 micrometers.

4. The catalyst assembly of claim 1, wherein the metal oxide is of an amount of 90 weight percent based on total weight of the substrate hairs.

5. A catalyst assembly comprising:
   a substrate including a substrate base and a number of substrate hairs extending from the substrate base, the substrate base including a metal M, the number of substrate hairs including an oxide of the metal M; and
   a catalyst film contacting at least a portion of the substrate, wherein the substrate base includes a plurality of first and second spaced apart strands extending in first and second directions, respectively, to form a mesh with openings each bonded by an adjacent pair of the first spaced apart strands and an adjacent pair of the second spaced apart strands, the number of substrate hairs extending from at least one of the first and second spaced apart strands.

6. A catalyst assembly comprising:
   a substrate including a substrate base and a number of substrate hairs extending from the substrate base, the substrate base including a metal M, the number of substrate hairs including an oxide of the metal M; and
   a catalyst film contacting at least a portion of the substrate, wherein the substrate base includes a number of discontinuous, spaced apart areas, the number of substrate hairs contacting at least one of the number of spaced apart areas.

7. A catalyst assembly comprising:
   a substrate including a substrate base and a number of substrate hairs extending from the substrate base, the substrate base including a metal M, the number of substrate hairs including an oxide of the metal M; and
   a catalyst film contacting at least a portion of the substrate, the catalyst film includes a first catalyst atomic layer, a second exposed catalyst atomic layer, and a number of intermediate catalyst atomic layers between the first and second catalyst atomic layers, wherein the total number of the catalyst atomic layers is 2 to 20 atomic layers.

8. A method of forming a catalyst assembly, comprising;
   oxidizing a substrate base including the metal M, in the presence of a humidifying gas flow, to form an oxide of the metal M as a number of substrate hairs extending from the substrate base; and
   depositing a catalyst film onto the substrate base and the number of substrate hairs.

9. The method of claim 8, wherein a first portion of the substrate is oxidized in the oxidizing step, thereby leaving an unoxidized portion of the substrate base forming the substrate base.

10. The method of claim 8, wherein the humidifying gas flow includes at least one of oxygen, nitrogen and carbon dioxide.

11. The method of claim 8, further comprising humidifying a gas flow to form the humidifying gas flow.

12. The method of claim 11, wherein the humidifying step is carried out before the oxidizing step.

13. The catalyst assembly of claim 5, wherein the substrate hairs have an average thickness dimension of 10 to 200 nanometers.

14. The catalyst assembly of claim 5, wherein the metal oxide is of an amount of 90 weight percent based on total weight of the substrate hairs.

15. The catalyst assembly of claim 6, wherein the metal oxide is of an amount of 90 weight percent based on total weight of the substrate hairs.

16. The catalyst assembly of claim 7, wherein the metal oxide is of an amount of 90 weight percent based on total weight of the substrate hairs.

17. The catalyst assembly of claim 7, wherein the substrate hairs have an average length dimension of 0.05 to 20 micrometers.

* * * * *